United States Patent [19]
Bernstein et al.

[11] Patent Number: 5,903,383
[45] Date of Patent: May 11, 1999

[54] ELECTROSTATIC MEMORY MICROMIRROR DISPLAY SYSTEM

[75] Inventors: Jonathan J. Bernstein, Medfield; Brian Cunningham, Stow, both of Mass.

[73] Assignee: The Charles Stark Draper Laboratory Inc., Cambridge, Mass.

[21] Appl. No.: 08/858,518

[22] Filed: May 19, 1997

[51] Int. Cl.⁶ .................................................. G02B 26/08
[52] U.S. Cl. .................... 359/298; 359/223; 359/291; 359/295
[58] Field of Search .................... 359/291, 223, 359/318, 298, 295

[56] References Cited

U.S. PATENT DOCUMENTS

| | | | |
|---|---|---|---|
| 3,796,480 | 3/1974 | Preston, Jr. et al. | 359/290 |
| 4,001,635 | 1/1977 | D'Auria et al. | 359/223 |
| 5,083,857 | 1/1992 | Hornbeck | 359/291 |
| 5,523,878 | 6/1996 | Wallace et al. | 359/290 |
| 5,535,047 | 7/1996 | Hornbeck | 359/295 |
| 5,579,151 | 11/1996 | Cho | 359/291 |

*Primary Examiner*—Georgia Epps
*Assistant Examiner*—Margaret Burke
*Attorney, Agent, or Firm*—Iandiorio & Teska; Erik Fako

[57] ABSTRACT

An electrostatic memory micromirror display system including an array of electrostatic memory and display assemblies each including a memory and display element having a mirror surface and a conductive medium; a support device for movably mounting the memory and display element; and a set of electrodes including at least first and second electrodes proximate the conductive medium; and means for selectively applying a voltage to the first electrode of predetermined ones of the memory and display assemblies to establish an electrostatic field between the first electrode and the conductive medium to urge the associated display element from a first position toward a second position and for applying a voltage to the second electrode of the assemblies to establish an electric field between the second electrode and the conductive medium to set the memory and display element in the second position.

17 Claims, 5 Drawing Sheets

ELECTROSTATIC MEMORY MICROMIRROR DISPLAY SYSTEM

FIELD OF INVENTION

This invention relates to an electrostatic memory micromirror display system, and more particularly to such a system which electrostatically both sets and stores the desired position of each micromirror.

BACKGROUND OF INVENTION

Digital micromirror display systems are becoming ever more widely used in display applications because of their low voltage and high resolution characteristics. These digital micromirror display systems are typically constructed as an array of display assemblies arranged in a matrix of rows and columns. Each assembly or cell is commanded through row and column address lines which connect to a semiconductor electronic memory circuit that stores the pixel information as to the desired orientation of the associated micromirror. Only after the pixel data has been stored does the memory circuit operate the micromirror mechanism to position it to be on or off, that is: to reflect the projected light to one of two alternate directions. One serious problem with these systems is that the manufacturing process for the combined semiconductor memory circuit and the superimposed micromirror mechanism is very complicated, expensive and has a low yield. Typically, twenty-five to thirty photomask steps are required to fabricate the combined microelectronic memory and micromechanical micromirror. The yield decreases with the increasing number of fabrication steps. This coupled with the fact that there are a million or so memories and a million or so micromirrors that must be fabricated make it unlikely that many perfect displays can be produced. Even one pixel which does not function properly can produce a highlight or dark spot perceivable by the human eye.

SUMMARY OF INVENTION

It is therefore an object of this invention to provide an electrostatic combined memory and micromirror display system.

It is a further object of this invention to provide such a combined memory and micromirror display system which is simpler and dramatically reduces the number of fabrication steps.

It is a further object of this invention to provide such a combined memory and micromirror display system which increases yield and reduces cost.

It is a further object of this invention to provide such a combined memory and micromirror display system which eliminates the need for an electronic memory circuit associated with each micromirror.

It is a further object of this invention to provide such a combined memory and micromirror display system which electrostatically both stores and sets the desired mirror position.

The invention results from the realization that a truly simple, low cost, high yield micromirror display can be effected by using an electrostatic field applied to a micromirror display element to both store the desired position and set and hold the micromirror in that position without the need for separate semiconductor memory circuits by energizing a pair of electrodes, one to bias the micromirror toward a position and a second electrode to set and hold it in that position through a network of row and column address lines.

This invention features an electrostatic memory micromirror display system including an array of electrostatic memory and display assemblies. Each electrostatic memory display assembly includes a memory and display element having a mirror surface and a conductive medium, a support device for movably mounting the memory and display element, and a set of electrodes including at least first and second electrodes proximate the conductive medium. There are means for selectively applying a voltage to the first electrode of predetermined ones of the memory and display assemblies to establish an electrostatic field between the first electrode and the conductive medium to urge the associated display element from a first position toward a second position and for applying a voltage to the second electrode of the memory and display assemblies to establish an electric field between the second electrode and the conductive medium to set and hold the memory and display element in the second position.

In a preferred embodiment the array may include a plurality of rows and columns of the assemblies. The conductive medium may be on one side of the memory and display element proximate the electrodes and the mirror surface may be on the other side. The support device may mount the memory and display element in the first position. The set of electrodes may include third and fourth electrodes proximate the conductive medium. The means for selectively applying may include means for applying voltage to the third electrode of predetermined ones of the electrode and display assemblies to establish an electrostatic field between the third electrode and the conductive medium to urge the associated display element from a first position to a third position and for applying a voltage to the fourth electrode of the memory and display assembly to establish an electric field between the fourth electrode and the conductive medium to set the memory and display element in the third position. The first position may be a centered position. The second and the fourth electrodes may be electrically connected. The support device may rotatably mount the memory and display element at one end or at the middle. The means for selectively applying may include row address lines and column address lines. The column address lines may be connected with the first electrodes and the row address lines may be connected with the second electrodes. The second column address line may be connected with the third electrodes. One or more insulating stops or conductive stops maintained at the same electrical potential as the memory and display element may be used to limit the motion of the memory and display element. The means for applying a voltage may include means for grounding the conductive medium and the means for grounding may include the support device.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE PREFERRED EMBODIMENTS

Figure 1:
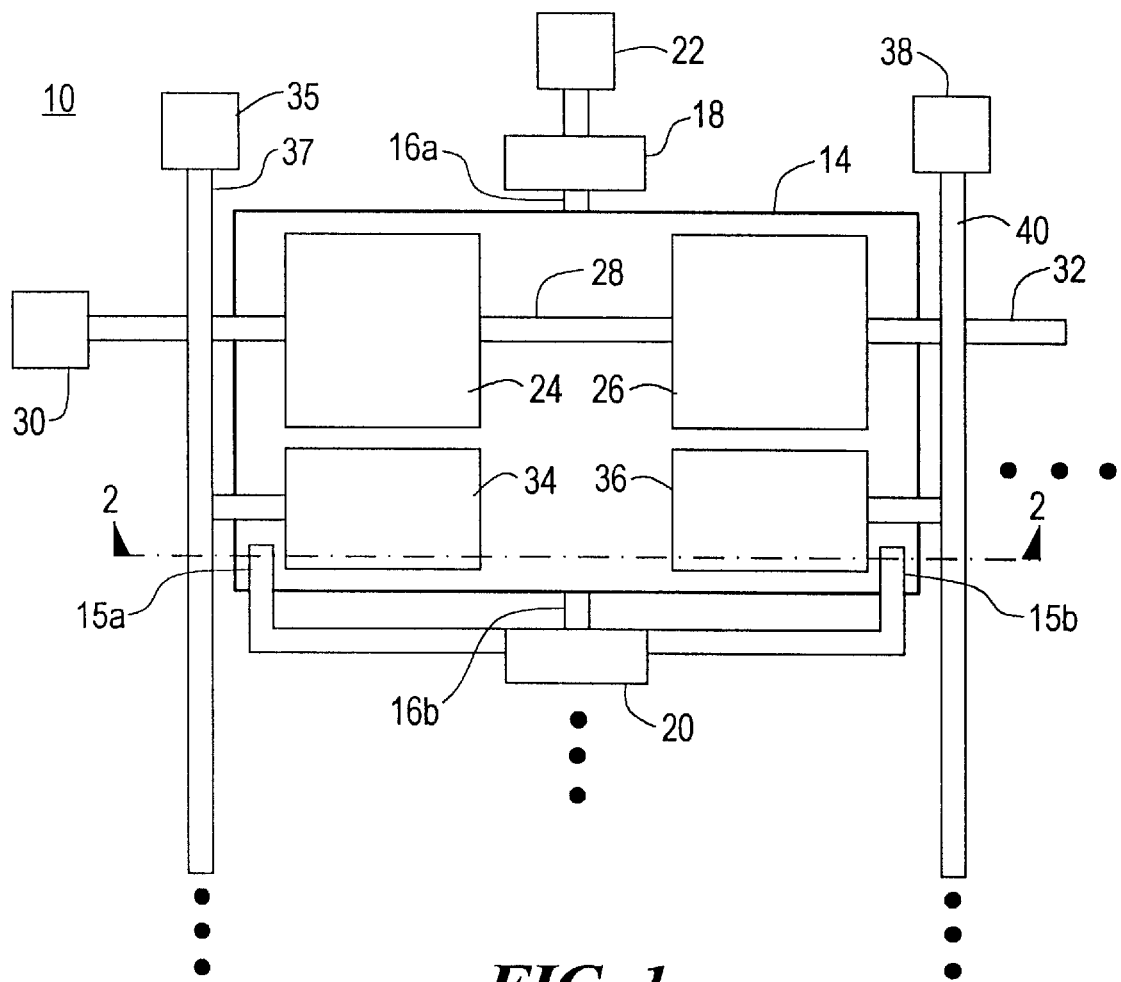
FIG. 1 is a schematic bottom plan view of an electrostatic memory micromirror display assembly according to this invention viewed from the bottom with the substrate removed.
Figure 2:
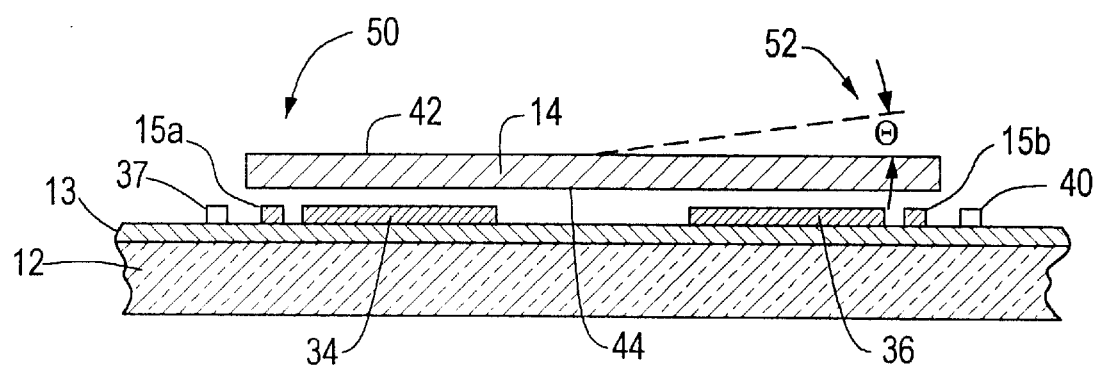
FIG. 2 is a cross-sectional view taken along line 2—2 of FIG. 1.

There is shown in FIG. 1 a view looking upward from the bottom of an electrostatic memory and micromirror display assembly 10 according to this invention which would normally be mounted on a substrate such as glass or silicon 12 with insulating layer 13 as in FIG. 2. Assembly 10 includes a display element 14 which is centrally mounted for rotation about a pair of torsional pivots 16a,b at its middle portion. Conductive stops 15 and 15a limit the motion of the micromirror; the stops are electrically connected to the mirror to prevent current flow upon contact. Torsional pivots 16a,b are supported by anchors 18 and 20 mounted on substrate 12. Memory and display element 14 is electrically grounded through anchor 18 and ground contact 22. Beneath memory and display element 14 are a pair of holding electrodes 24, 26 which are electrically connected via conductor 28 and are energized with a holding voltage $V_H$ applied at terminal 30. This voltage is also applied to subsequent assemblies 10 in the same row along conductor 32. Beneath memory and display element 14 are located two set electrodes 34 and 36, each of which is energized separately by a left set voltage $V_L$ through terminal 35 and left set bit line 37 and through right set bit line voltage $V_R$ through terminal 38 and right set bit line 40. The upper surface 42 of memory and display element 14 is a mirrored surface such as aluminum. The lower portion 44 is a conductive medium such as polycrystalline silicon.

Figure 4:
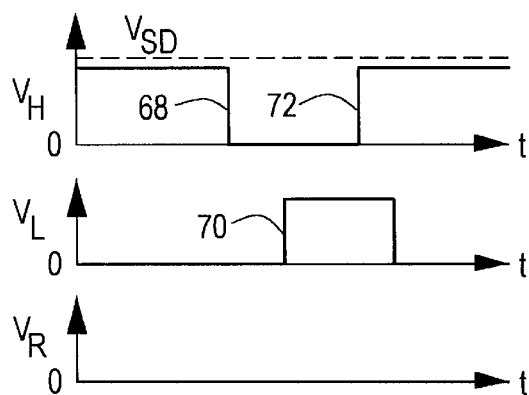
FIG. 4 illustrates the waveforms used to operate the assemblies of FIGS. 1, 2 and 3 to write left.
Figure 5:
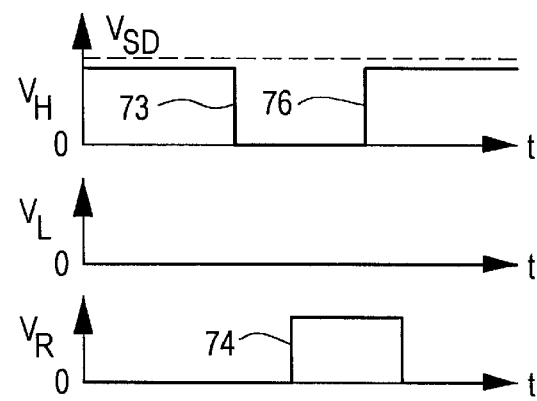
FIG. 5 is a view of the waveforms used to operate the assemblies of FIGS. 1, 2 and 3 to write right.

The electrostatic memory and display assembly 10 of FIG. 1 is a bistable device which operates as follows. If any assembly 10 in a given row is required to be energized, the hold voltage on that row, applied to terminal 30 and to each and every hold electrode 24, 26 in each assembly of that row, is momentarily set to zero to allow the mirror elements to reset to the neutral position. While the hold voltage is zero, a voltage is applied to either left bit line 37 through contact 35 (to tilt left) or to right bit line 40 through contact 38 (to tilt right). The bit line voltage so applied is not strong enough to snap the mirror through the full extent of motion, but only tilts the mirror slightly in the desired direction and breaks the symmetry of the neutral position. While the bit line voltage is applied, the hold voltage is reapplied, which rotates the mirror through the full range in the desired direction, thereby storing information in the mirror. The sequences of applied voltages for "write left" and "write right" are shown in FIGS. 4 and 5, respectively.

Assuming for example that $V_L$ was applied to terminal 35 and no $V_R$ (i.e., $V_R$=0 volts) was applied to terminal 38, then the mirror will tilt slightly in the counter-clockwise direction. When the hold voltage is subsequently increased to $V_H$, the mirror will rotate further clockwise to its maximum angle and hit stop 15a. Conversely, if voltage $V_R$ was applied to terminal 38 and $V_L$ applied to terminal 35 is zero, memory and display element 14 would rotate slightly in the clockwise direction. When the hold voltage is turned on the mirror 14 will rotate completely in the clockwise direction until it hits stop 15b. Thus the information supplied by the bit lines is stored by the corresponding position of the mirror. The electrostatic memory and display assembly 10 operates without any additional electronic semiconductor circuitry to both memorize the commanded information and assume the commanded position.

While the hold voltage is applied to a row, variations in the bit line voltages are not strong enough to affect the position of the mirror. Data is written only to the row which has the hold voltage set to zero, enabling data to be written to one row at a time.

Typically the mirror element 14 will strike a conductive stop 15a or 15b which limits the motion of the mirror, said conductive stop being electrically at the same potential as the mirror element to prevent flow of current during contact. Alternatively, insulating stops can also be used. The conductive portion 44 of the mirror 14 is never allowed to touch the hold electrodes 24, 26 or the bit electrodes 34, 36 to prevent a short circuit which might damage the mirrors or weld them into a fixed position.

Figure 3:
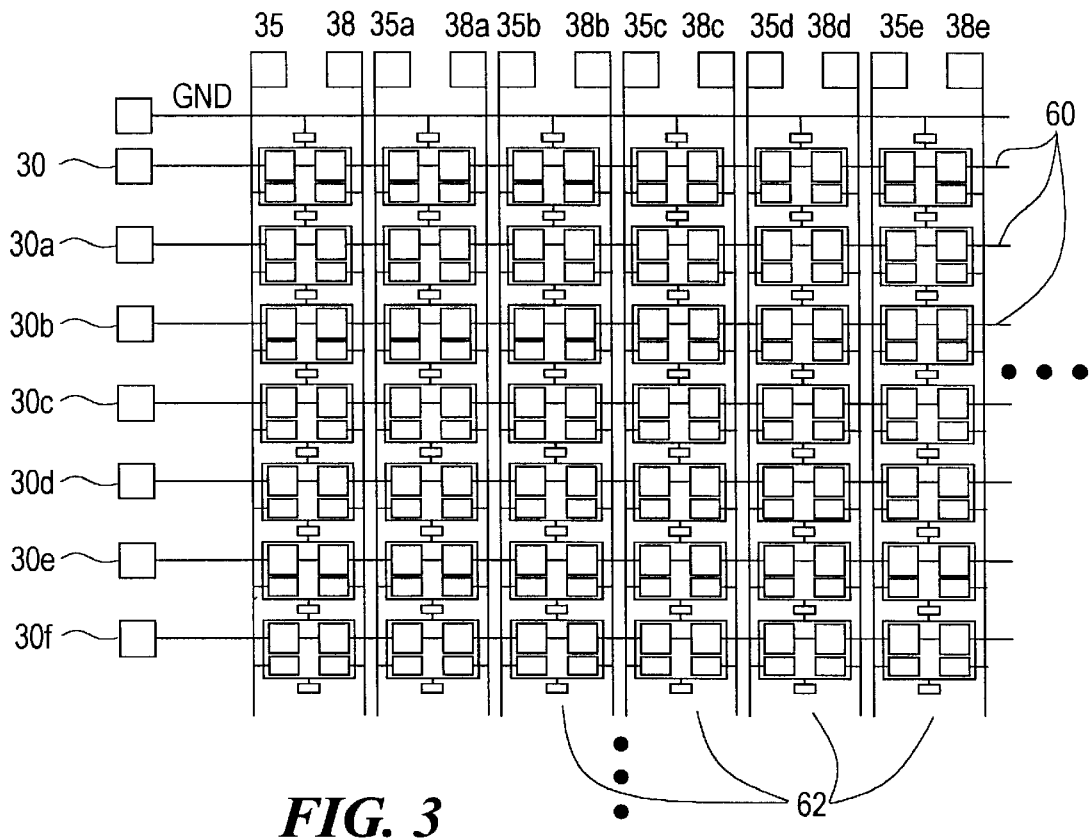
FIG. 3 is a view of a portion of a matrix of rows and columns made up of the electrostatic memory micromirror display assemblies of FIGS. 1 and 2 according to this invention.

Typically a plurality of electrostatic memory and display assemblies 10 are combined in a matrix array 48 as indicated in FIG. 3 in a plurality of rows 60 and columns 62. Each row has its own terminal 30, 30a, 30b, 30c and so on, by means of which the hold electrodes 24, 26 in each assembly are energized and each column has its own left and right terminals 35, 38, 35a, 38a, 35b, 38b, 35c, 38c and so on, by which the left and right set bit lines are controlled. Energization occurs as shown in FIG. 3 for a write-left operation, where it can be seen that first the hold voltage $V_H$ is set to zero at time 68. Subsequently $V_L$ is turned on at time 70 breaking symmetry and rotating the mirror slightly to the left (counter clockwise direction 50). Then when $V_H$ is reapplied at time 72, the mirror 14 rotates completely counter clockwise until it hits the stop 15a. Note that in FIG. 4, since it is not desired to write right, the $V_R$ signal remains low for the entire time. If it is desired to write right, the sequence of operation is shown as in FIG. 5.

Here the hold voltage is temporarily set to zero at time 73, followed by the introduction of the bit information by applying a voltage at time 74 to bit line 40 and electrode 36, which breaks symmetry and rotates the mirror slightly to the right (clockwise direction 52). Subsequently when the hold voltage is reapplied at time 76, the mirror rotates completely clockwise until it hits stop 15b.

Figure 6:
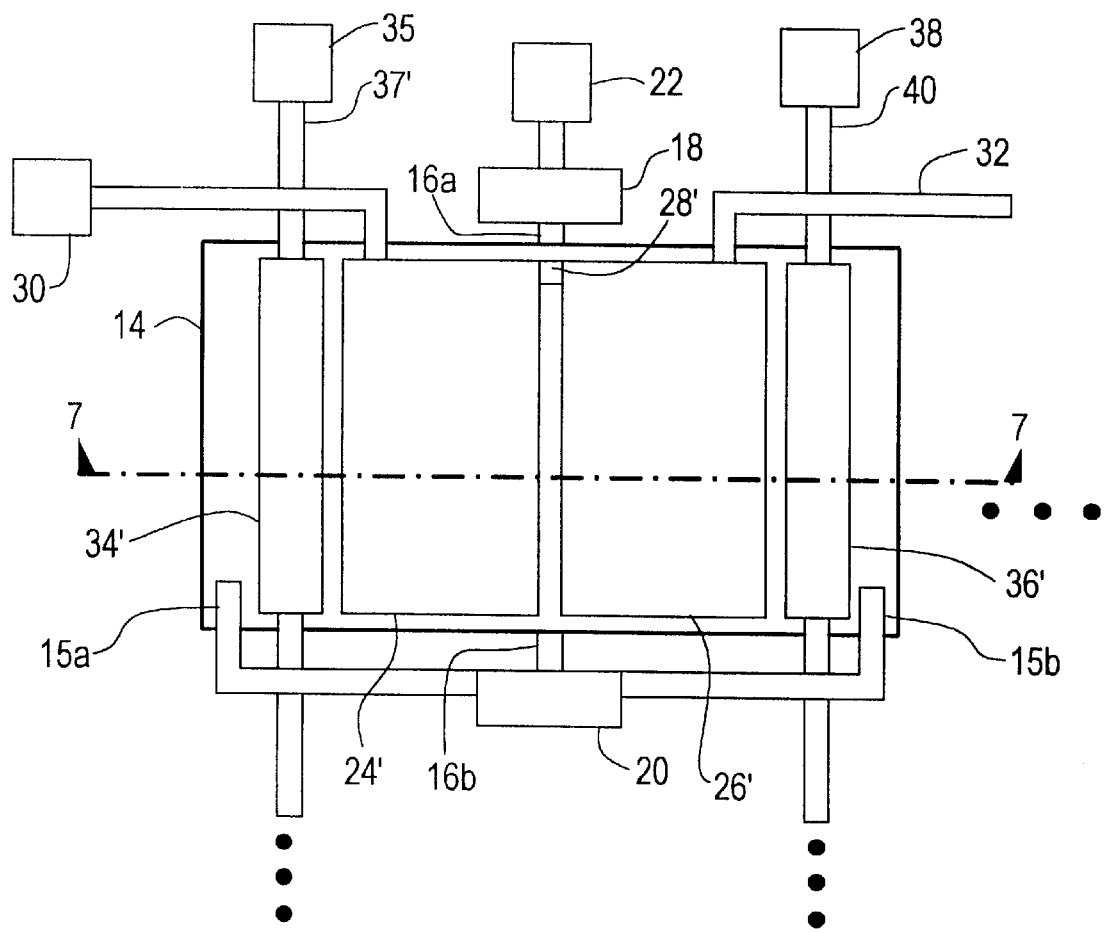
FIG. 6 is a view similar to FIG. 1 of another construction of an electrostatic memory micromirror display assembly according to this invention.
Figure 7:
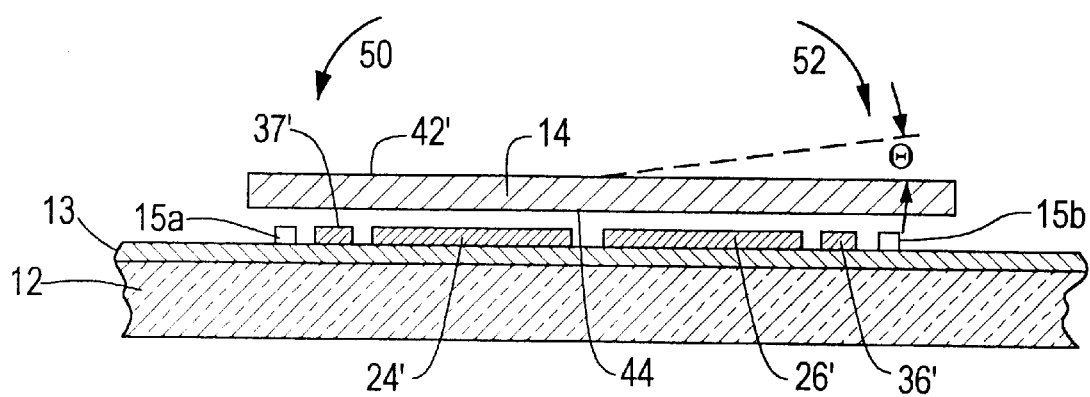
FIG. 7 is a view taken along line 7—7 of FIG. 6.

In another embodiment, as shown in FIGS. 6 and 7, electrodes 24, 26 and 34, 36 can be rearranged as shown by counterpart electrodes 24', 26' which are side by side in FIGS. 6 and 7, with counterpart electrodes 34' and 36' disposed on the outside edges of memory display element 14. The operation is unchanged.

Figure 8:
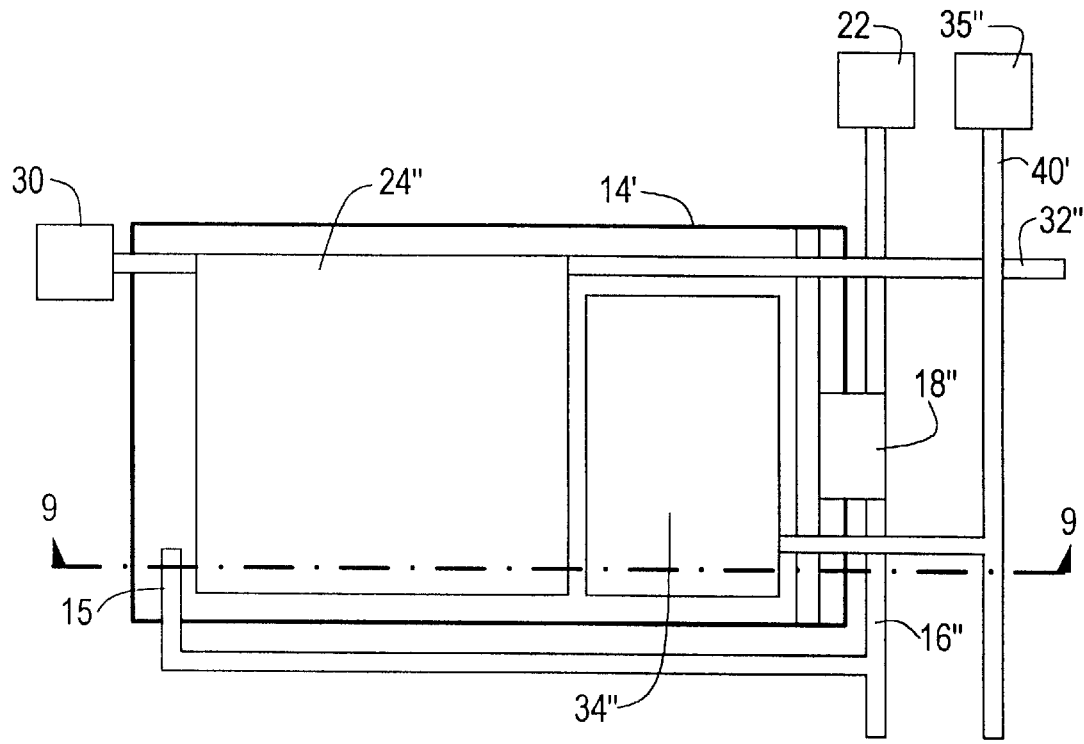
FIG. 8 is a view similar to that of FIG. 1 of another construction of an electrostatic memory micromirror display assembly according to this invention.
Figure 9:
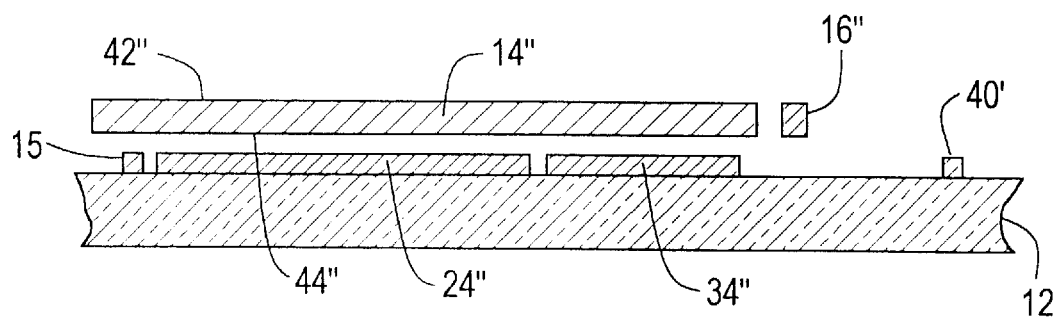
FIG. 9 is a view taken along line 9—9 of FIG. 8.

Although assemblies 10 and 10' depicted in FIGS. 1 and 2 and 6 and 7, respectively, are symmetric bistable devices, an asymmetric bistable device can also be made according to this invention as shown in FIGS. 8 and 9, where memory and display element 14" is pivotably mounted at one end by torsional pivot 16" at anchor 18". In that case it does not require both electrodes 24 and 26 but only one counterpart hold electrode 24", and it does not require two set electrodes 34 and 36 but only one counterpart electrode 34". The hold voltage $V_H$ is still applied at terminal 30 to energize electrode 24" and any subsequent corresponding electrodes via connector 32". Element 14' is grounded through ground terminal 22 as previously, but a single terminal 35" replaces both terminals 35 and 38.

Figure 10:
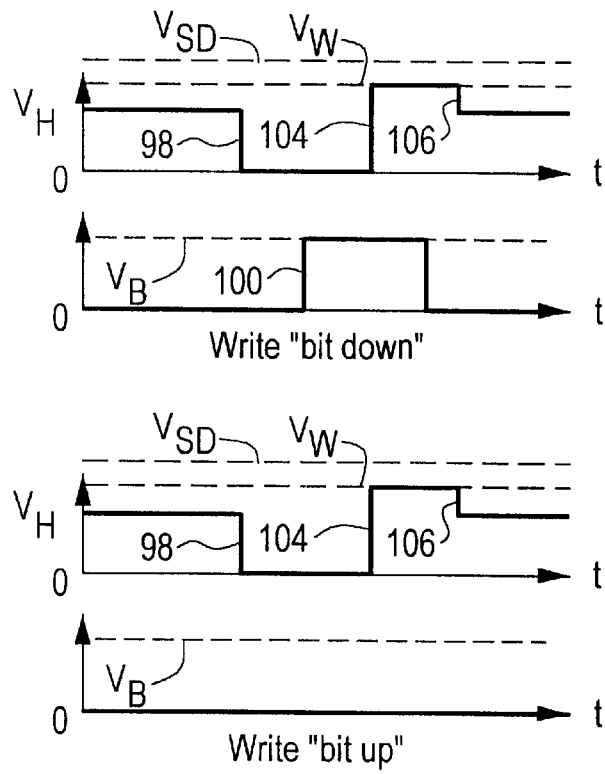
FIG. 10 illustrates the waveforms used to operate the electrostatic memory micromirror display assembly of FIGS. 8 and 9 in the bit down and bit up states.

The asymmetric bistable mirror has two states: "mirror up" and "mirror down". The timing diagram of applied voltage for writing data to the mirror of FIGS. 8 and 9 is shown in FIG. 10. The hold voltage to contact 30 and on 32" is set to zero at time 98 to restore all mirrors in that row to the "up" position. Subsequently at time 100 the data is applied to data line 35", with a zero voltage to write "bit up" or a voltage $V_B$ to write "bit down". Then, at time 104 the hold voltage is increased to a level just under the snap down voltage, $V_W$. This voltage is just enough to snap the mirror down (direction 102) if the contact 35" and electrode 34" are set to $V_B$ but not enough to snap the mirror down if electrode 34" is at zero volts. At time 106 the hold voltage is decreased to a lower voltage $V_H$ which is sufficient to hold down those mirrors in the "down" state but is insufficient to snap down a mirror in the "up state" regardless of whether electrode 34" is at zero or at voltage $V_B$.

The mirror, if snapped down, contacts stop 15, which may be electrically conducting and held at the same potential as the mirror, or the stop may be electrically insulating.

Figure 11:
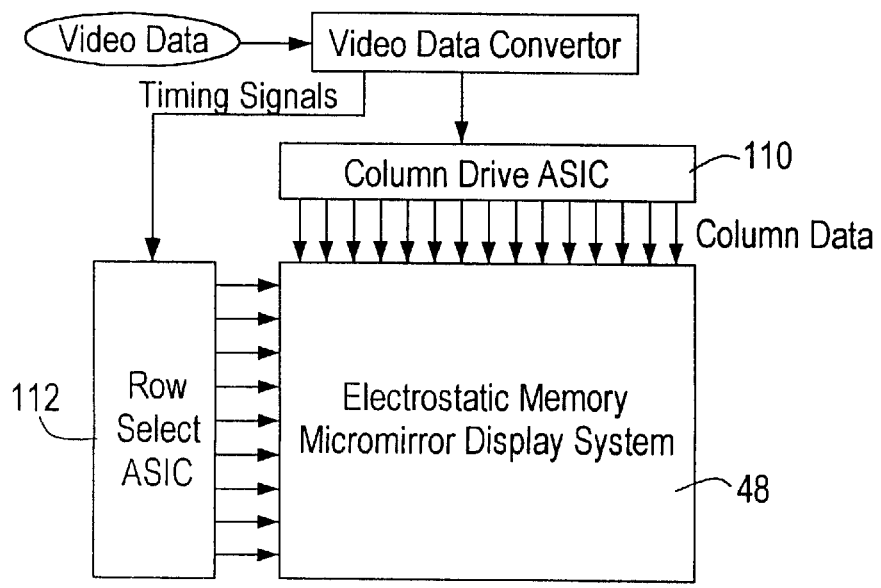
FIG. 11 is a schematic block diagram of an electrostatic memory and display system according to this invention employing a number of electrostatic memory micromirror display assemblies in combination with conventional row and column address select circuits.

The operation and sequencing of matrix 48, FIG. 3, can be accomplished as shown in FIG. 11, using an electronic circuit to activate the desired row, and to decode the video signals to provide the desired state of each pixel, which is well known in the art as exemplified by the disclosure in U.S. Pat. No. 5,490,009, incorporated herein in its entirety by reference.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An electrostatic memory micromirror display system comprising:

an array of electrostatic memory and display assemblies each including a memory and display element having a mirror surface and a conductive medium;

a support device for movably mounting said memory and display element;

a set of electrodes including at least first and second electrodes proximate the conductive medium; and means for selectively applying a voltage to said first electrode of predetermined ones of said memory and display assemblies to establish an electrostatic field between said first electrode and said conductive medium to urge the associated display element from a first position toward a second position and for applying a voltage to said second electrode of said memory and display assemblies to establish an electrical field between said second electrode and said conductive medium to set and hold said memory and display element in said second position, wherein said mirror and display element stores data in said second position.

2. The electrostatic memory micromirror display system of claim 1 in which said array includes a plurality of rows and columns of said assemblies.

3. The electrostatic memory micromirror display system of claim 1 in which said conductive medium is on one side of said memory and display element proximate said electrodes and said mirror surface is on the other side.

4. The electrostatic memory micromirror display system of claim 1 in which said support device mounts said memory and display element in said first position.

5. The electrostatic memory micromirror display system of claim 1 in which said set of electrodes includes third and fourth electrodes proximate said conductive medium.

6. The electrostatic memory micromirror display system of claim 5 in which said means for selectively applying a voltage includes means for applying a voltage to said third electrode of predetermined ones of said memory and display assemblies to establish an electrostatic field between said third electrode and said conductive medium to urge the associated display element from said first position to a third position and for applying a voltage to said fourth electrode of said memory and display assemblies to establish an electrical field between said fourth electrode and said conductive medium to set said memory and display element in said third position.

7. The electrostatic memory micromirror display system of claim 6 in which said first position is a centered position.

8. The electrostatic memory micromirror display system of claim 6 in which said second and fourth electrodes are electrically connected.

9. The electrostatic memory micromirror display system of claim 1 in which said support device rotatably mounts said memory and display element at one end.

10. The electrostatic memory micromirror display system of claim 1 in which said support device rotatably mounts said memory and display element in the middle.

11. The electrostatic memory micromirror display system of claim 2 in which said means for selectively applying a voltage includes row address lines and column address lines.

12. The electrostatic memory micromirror display system of claim 11 in which in which said column address lines are connected with said first electrodes and said row address lines are connected with said second electrode.

13. The electrostatic memory micromirror display system of claim 6 in which said array includes a plurality of rows and columns of said assemblies, said means for selectively applying includes row address lines and column address lines, and there are second column address lines connected with said third electrodes.

14. The electrostatic memory micromirror display system of claim 1 in which said means for applying a voltage includes means for grounding said conductive medium.

15. The electrostatic memory micromirror display system of claim 14 in which said means for grounding includes said support device.

16. The electrostatic memory micromirror display system of claim 4 including at least one conductive stop maintained at the same electrical potential as said memory and display element for limiting the motion of the mirror.

17. The electrostatic memory micromirror display system of claim 4 including at least one stop for limiting the motion of said memory and display element.

* * * * *